Patented Apr. 30, 1940

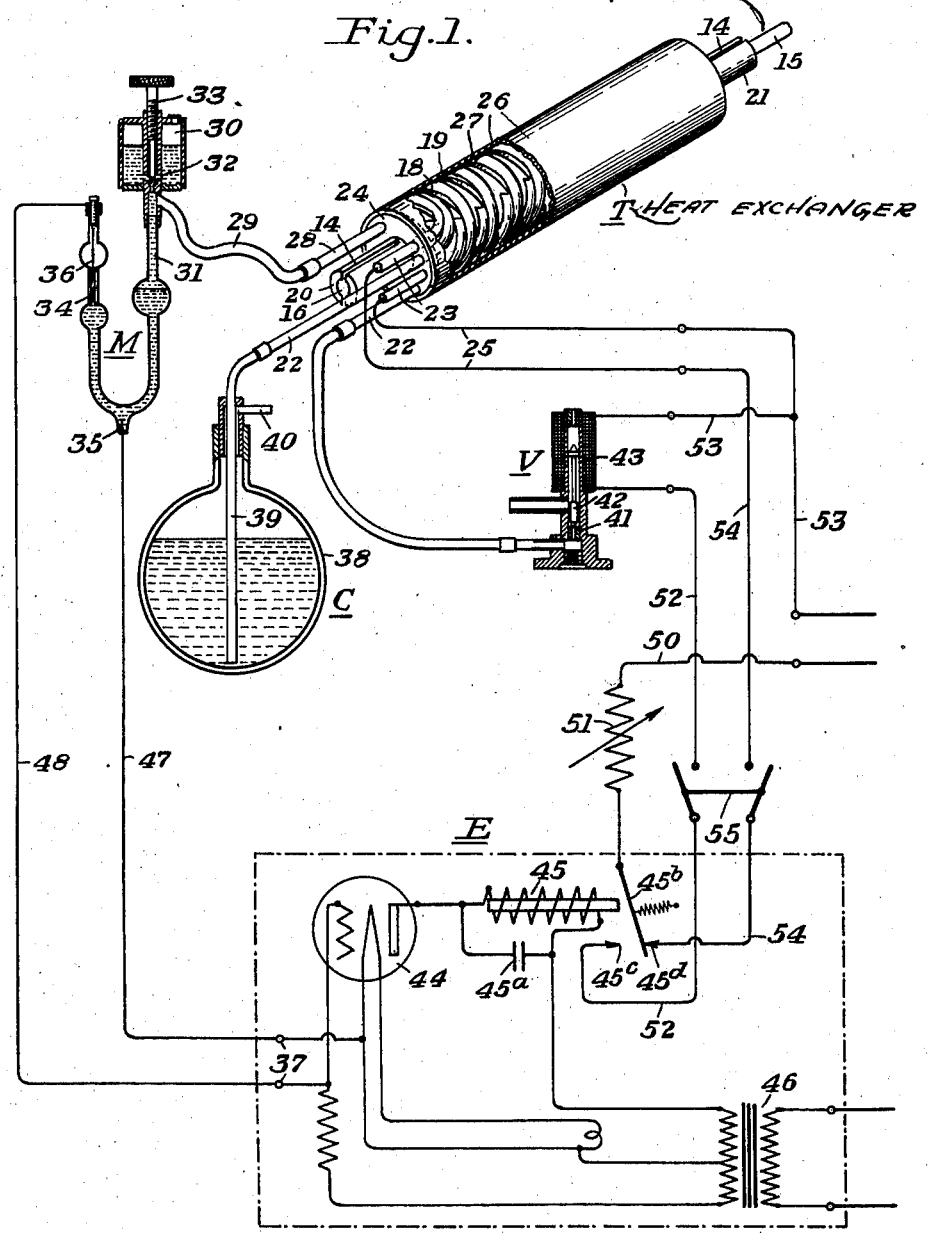

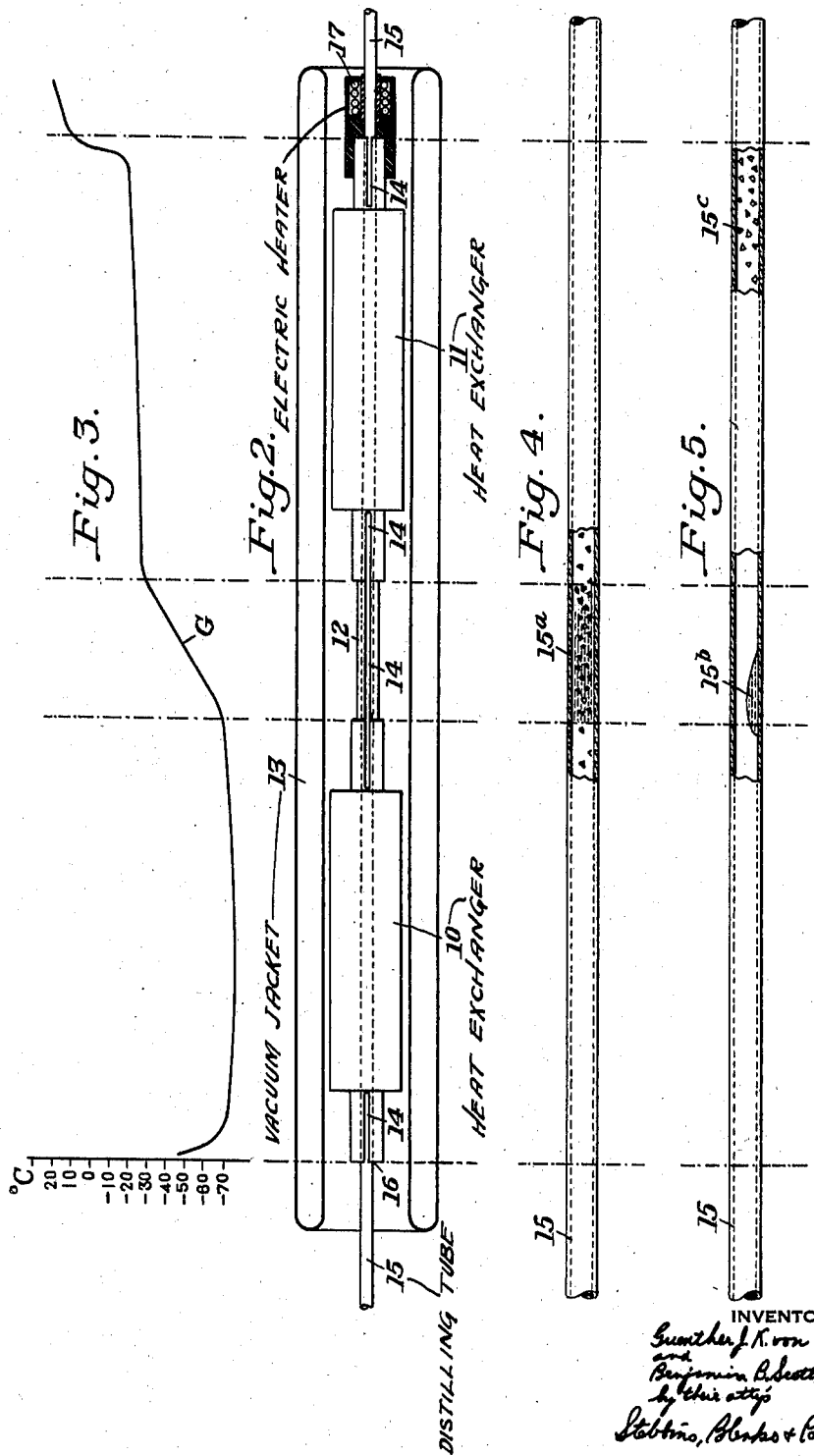

2,198,848

UNITED STATES PATENT OFFICE 2,198,848

METHOD FOR HIGH VACUUM FRACTIONAL DISTILLATION

Guenther J. K. von Elbe and Benjamin B. Scott, Jr., Pittsburgh, Pa., assignors to Carnegie Institute of Technology of Pittsburgh, Pittsburgh, Pa., a corporation of Pennsylvania Application June 29, 1936, Serial No. 87,914

7 Claims. (Cl. 202—52)

Our invention relates to the separation of the components of a mixture and is particularly applicable to fractional distillation in a high vacuum with complete recovery of the material being fractionated; i. e. without "holdup" in the column. The term "fractional distillation" as herein employed is meant to include what is ordinarily known as distillation and sublimation.

Both in laboratory work and in commercial practice, separation of the components of a mixture is commonly obtained by fractional distillation. Effective fractionation in apparatus using a conventional column requires a distillation rate sufficient to maintain a certain volume of liquid in the column and a high reflux ratio. This condition limits the use of such a column to temperatures above that at which the vapor pressure of the mixture is about one millimeter pressure of mercury. Since the fractionation or fractional distillation depends on repeated condensation and re-evaporation along the temperature gradient maintained in the column, a certain volume of liquid is necessarily continuously held in the column. This "hold-up" of the column normally limits the minimum size of the sample to be used so that from 2 to 4 c. c. is required.

Though it is possible to distill smaller samples at vapor pressures lower than one millimeter of mercury, nevertheless, at very low pressures, such as are used in a molecular still—which may be defined as a still operated at a pressure such that the distance from the evaporating surface to the condensing surface is less than the mean free path of the vaporized molecules—it has been found that the individual components each distill at a rate proportional to their partial vapor pressures, so that separation of a pure component is not possible without repeated distillations equivalent to the condensation and re-evaporation occurring in the conventional column. Vacuum distillation, we have discovered, has the advantage of permitting operation at lower temperatures where the relative differences in vapor pressures of the components may be greater and at temperatures below that at which thermal decomposition takes place. We have discovered that by a proper utilization of the behavior of substances due to the differences in their vapor pressures at certain temperatures, it is possible to separate the components of a mixture in such a manner that such components may be of a purity which has hitherto been impossible to obtain.

By the use of our invention, it is possible to fractionally distill very small samples ranging from 0.001 c. c. to 0.1 c. c. upwardly in a high vacuum, and to obtain much more satisfactory results than has hitherto been possible. We have invented apparatus and a method which enables fractional distillation to take place with complete recovery of the material being fractionated and wherein there is substantially no "hold up" in the distilling tube. We are thus enabled to readily separate individual components from a mixture and to obtain much more satisfactory results than have hitherto been possible. Moreover, a very small sample ranging from 0.001 c. c. to 0.1 c. c. will suffice, although larger amounts may be used, and the components thereof can be sharply separated and completely recovered. Our method and apparatus, may be used at temperatures above or below room temperatures depending on the characteristics of the mixture to be fractionated and with mixtures, the components of which have boiling points which are close to one another.

We have invented suitable apparatus for carrying out our invention, which apparatus we shall hereafter describe and by which we are able to obtain separation of the components of the mixture in a highly satisfactory manner, due to their difference in vapor pressures. Our apparatus is such that we can maintain a suitable (exceedingly constant) temperature gradient through which the sample may be moved to accomplish fractional distillation thereof.

The sample is placed in a tube within the apparatus under vacuum in such a manner that two spaced apart or related units, acting as heater and cooler, respectively, with the aid of the necessary temperature control and motion control devices, cause distillation of the volatile components of the mixture under the influence of the temperature conditions and vacuum from that section called the heater zone to that called the cooler zone. The more volatile components will distill more rapidly than the less volatile. It is to be understood that heater and cooler, as well as heater zone or hot zone, and cooler zone or cold zone, are terms representing that the heater or heater zone and cooler or cooler zone are run at relatively different temperatures. The heater or heater zone may be run at a temperature above or below room temperatures and the cooler or cooler zone may be run at a temperature above or below room temperatures. It will also be understood that the heater or heater zone will always be run at a temperature higher than the cooler or cooler zone. The temperature gradient so formed is such that distillation takes place at temperatures at which the difference in vapor pressures of the components of the material to be separated is of an order sufficient to allow appreciable fractionation.

In order to produce separation of the components, the tube is slowly moved towards the heater through the temperature gradient maintained between the heater and the cooler, respectively, or the tube may be held fixed and the apparatus maintaining the temperature gradient moved with the cooler advancing towards the sample. The movement of the sample relative to the temperature gradient between the heater and cooler causes repeated fractionation of the material and separation to take place in such a manner that each component forms a separate band of material along the distilling tube. When separation has been completed, control of the movement of the tube with the aid of automatic pulling devices allows the products to be moved towards the end for removal and the temperature of the heater or the pulling speed or both is adjusted so that the least volatile constituent of the mixture will become or remain unvaporized as a component band in the heating zone. This component can be removed in various ways as will later be described.

Due to the pressure gradient within the distilling tube along the temperature gradient, the vapor of the more volatile components tends to be swept away from the warm to the cool end. For this reason, the less volatile component is obtained in a state of great purity.

By our invention, although we accomplish fractional distillation by repeated evaporation and condensation, there is no reflux in the distilling tube. The term "reflux" is herein used to designate the movement by gravity of a substance, condensed in the distilling tube, from the cold zone of the tube toward the hot zone.

In the accompanying drawings, illustrating a present preferred embodiment of our invention, and in which like numerals are employed to designate like parts, throughout the same;

Figure 1 is a more or less schematic view of one end of an apparatus embodying our invention;

Figure 2 is a schematic view showing a part of our apparatus;

Figure 3 is a representative temperature gradient;

Figure 4 is a view of a distilling tube at the start of a run on an enlarged vertical scale;

Figure 5 is a view of a distilling tube at the end of a run on an enlarged vertical scale.

The apparatus, see Figure 2, consists in general of two separately controlled, spaced apart thermostatically controlled heat exchangers or thermostats 10 and 11, referred to hereinafter as cooler and heater, respectively, connected by a gradient tube 12 and surrounded by a transparent vacuum jacket 13. The region between the two thermostats has definite temperature characteristics, as will be seen from an inspection of Figure 3. This region between the vertical chain lines of Figure 3 and designated G is referred to as a "temperature gradient." Each of the thermostats are alike, each has its own separate temperature control system, and each may be operated at temperatures above or below normal room temperatures, the cooler always at a lower temperature than the heater. The jacket reduces heat losses and prevents condensation of moisture upon the cold parts of the equipment. Both thermostats and the gradient tube are constructed of copper to allow for rapid heat transference. The reduced end portions of the thermostats and the gradient tube have slots 14 therein to permit observation of the fractionating process within the glass distilling tube 15 which passes through the axial bore 16 of the thermostats and the gradient tube. A small annular electric heater 17 is secured to the reduced outer end portion of heater 11 and is used to facilitate the removal of the separated products from the distillation tube 15.

In Figure 1, there is shown a more or less schematic view of one of the thermostats with its associated temperature control apparatus. T represents a thermostat or heat exchanger, M a manometer system, C a fluid container, V a fluid valve and E an electric circuit control system. The thermostat T comprises a round copper bar 18 having an axial passage 16 therethrough, a main portion 19, and reduced end portions 20 and 21, which end portions have slots 14 therein. Formed in this bar is a spiral groove of a small pitch and of a size to accommodate two closely coiled copper heat transfer tubes 22 and 23. The depth and width of this groove is equal to 2D (D being the diameter of each of the tubes 22 and 23). A spiral groove, of opposite hand, (2D wide by D deep is also formed in the remaining groove sides. Both ends of the main portion of the copper bar are machined to leave narrow cooling chamber end plates 24. The tube 23, containing an insulated resistance wire 25, and the hollow tube 22, are wound in the grooves formed in the copper bar, and the starts and finishes of both tubes are brought outside through holes in the end plate 24. A thin copper shell 26 is fitted over the coils and together with the tube ends are suitably secured to the end plates 24 by brazing or welding to form a gas and liquid-tight control fluid chamber 27. A length of copper tubing 28 is attached to and passes through the end plate 24 and into fluid chamber 27. Tubes 22 and 23 are placed in the grooves cut into the copper bar for the reason that the remaining metal between the grooves provides more surface for rapid heat transfer through the temperature controlling medium which is introduced into the fluid chamber and results in a faster establishment of a temperature equilibrium throughout the thermostat. The ends of the insulated resistance wires 25 are brought to convenient connector points. One end of tube 22 is connected to container C and the other end of the tube is connected to the electric fluid valve V. Tube 28 is connected to the manometer system M by means of the manometer line or tube 29.

The manometer system M consists of a fluid reservoir 30 connected to an upstanding tube 31 of a mercury manometer. The connecting tube 29, which leads from the thermostat, is connected into the passage between the fluid reservoir 30 and the manometer tube 31. The fluid reservoir 30 communicates with manometer tube 31 by way of a port 32 controlled by a needle valve 33. The fluid chamber or reservoir 30 can be connected to or completely isolated from the system by operation of the needle valve 33, during the adjustment of the thermostat temperature, or after temperature equalization within the thermostat has taken place and temperature control is desired.

The operation of this manometer system is as follows: The needle valve 33 is unscrewed the necessary amount, thus connecting the reservoir 30 to the manometer and thermostat temperature regulating or control fluid chamber 27. The thermostat is adjusted (cooled or heated) to the predetermined temperature. During this operation, enough controlling fluid enters or leaves the thermostat through the manometer line 29 from the reservoir 30 to compensate for the volume changes of the fluid caused by the cooling or heating of it. It is important in filling the space in the regulating chamber 27 and connecting tube that all air and gas be removed, because the much greater compressibility, as compared to a liquid, of any gas remaining would produce insensitivity of the temperature control system, since the control is dependent upon the change of pressure produced by expansion and contraction of the control liquid in the chamber 27 with change of temperature.

After the thermostat has reached the desired operating temperature, which temperature may be ascertained by means of suitably placed thermocouples, or by other means, the needle valve 33 is closed, thus isolating the reservoir 30 from the manometer system and forcing the manometer to respond to volume changes of the controlling fluid in the thermostat with changes in the temperature. The rise and fall of the mercury column 34 in the manometer makes and breaks the circuit through the manometer fixed contact 35 and adjustable contact 36, which are connected to the control contacts 37 of the electric control system E, thus controlling the heat transfer equipment through the electric control system E and fluid valve V, so that automatic temperature control is obtained. It is apparent that adjustment for temperature control is simply and readily made by use of this arrangement.

The container C contains, when low temperatures are required in the system, a low boiling fluid such as liquid air or liquid nitrogen, and in such case may be the standard metal vacuum flask 38. The flask has a tube 39 which extends adjacent to the bottom of the flask and is connected to one end of tube 22. By means of a tube 40, pressure may be applied from a suitable source to the surface of the liquid in the container.

Connected to the other end of the tube 22 is an electric fluid valve V. The fluid valve has a port 41, which is connected to tube 22. The opening and closing of the port 41 controls the discharge of the fluid from the tube 22. The port is controlled by needle valve 42 made from magnetic material, which, in turn, is controlled by means of an electric coil or solenoid 43. When the solenoid 43 is energized the needle valve is lifted, and the gas or air pressure in the tube 22 is released through port 41 and heat transfer fluid, for example, liquid nitrogen when a low temperature is desired, is forced from flask 38 through the coil 22, resulting in the cooling of the thermostat T.

When it is desired to increase the temperature in the thermostat T, an electric current is caused to flow through the resistance wire 25 in tube 23. The flow of current through the fluid valve and through the wire 25 is controlled by means of the electric control system E.

The electric control system E comprises a more or less conventional vacuum tube circuit in which 44 represents the vacuum tube with cathode, plate and grid electrodes. In the plate circuit is a double-acting relay 45 having a condenser 45$^a$ shunting its terminals. The plate cathode and grid bias voltages are obtained from any suitable source, a transformer with multiple secondary windings being illustrated at 46. The transformer 46 furnishes a voltage for the vacuum tube plate circuit, a medium voltage for the grid bias circuit and a low voltage for the tube filament circuit. It will be observed that the C-bias voltage for the vacuum tube is furnished by a secondary on the power transformer 46. The relay 45 has an armature 45$^b$ which, when the plate current of the tube is flowing, is attracted by the relay to make a contact with contact point 45$^c$. When the plate current is not flowing, this armature is released, making contact with contact point 45$^d$. The vacuum tube plate current is controlled from the grid, the grid circuit including wire 47 leading from the cathode of the tube to one of the contact points 37, thence to contact 35 of the manometer. The other contact 36 of the manometer connects through wire 48 to the tube grid.

When the mercury in the manometer tube is low so that the control grid circuit through wires 47 and 48 is open, the C-bias voltage is applied to the grid of the tube and prevents the flow of current between the filament and the plate. When the mercury in the manometer rises to close the circuit through contacts 35 and 36, the grid is grounded to the filament, whereupon the tube grid is deenergized, and current will flow in the plate circuit to energize relay 45. Leading to the armature 45$^b$ of the relay is a wire 50 connected through a variable resistance 51 to one side of a source of current not shown. The contact 45$^c$ of the relay is connected through wire 52 to one end of the winding of the solenoid 43 of the electric fluid valve V. The other end of the winding of the solenoid is connected through wire 53 to the other side of the current supply circuit. Leading from relay contact 45$^d$ is a wire 54 connected to one end of wire 25 of the thermostat and the other end of wire 25 is connected to wire 53. A switch 55 is interposed in wires 52 and 54 and so arranged that either conductor 52 or 54, but only one at a time, can be placed in the circuit from the relay to the solenoid 43 or to heater wires 25.

*Operation of the system*

The thermostats and their associated control apparatus are assembled as shown in Figure 2, where they are spaced apart and united by means of the gradient tube 12 which is secured to the adjacent ends of the thermostats. Each of the thermostats are alike and each has its own associated temperature control apparatus, whereby different temperatures may be maintained, thus producing and maintaining a desired temperature gradient, as shown in Figure 3. The temperature gradient illustrated is suitable for the fractionation of a mixture of para and meta xylene, which components cannot be separated by hitherto known methods of fractional distillation. It will be observed that the temperatures of the cooler and heater, respectively, are different and these temperatures which may be varied during the run are determined beforehand by experiment. The method of obtaining and holding the required temperature is the same for both thermostats so that a description of the operation of one thermostat will be equally applicable to the operation of the other thermostat, since they are similar in construction. It will be also understood that by means of this apparatus any desired temperature may be indefinitely maintained in either thermostat, and our invention is not limited to low temperatures nor to any particular mixtures. It is essential that the external atmosphere about the distilling tube be maintained above the temperature of the heater.

We shall now describe the operation of the apparatus when it is desired to fractionally distill a typical mixture, for example, of para and meta xylenes. It is extremely difficult to separate these two substances by hitherto known methods of distillation, since their boiling points at atmospheric pressure are almost identical (139° C. and 138° C., respectively). By the use of our invention, the separation can be readily accomplished and the substances obtained in a high state of purity.

After the apparatus is assembled, the control fluid chamber 27, reservoir 30, and the tubes connecting the chamber and reservoir are filled with a suitable control fluid, in this case toluene, care being observed that all air and gas be removed from the system as heretofore described. The needle valve 33 is unscrewed, thus connecting the reservoir 30 to the manometer system and to fluid chamber 27. Air at a pressure of from 2 to 5 lbs. per sq. in. is applied by way of tube 40 to the surface of the liquid nitrogen in flask 38. Since the port 41 of the fluid valve V is closed, sufficient nitrogen will evaporate to produce pressure equalization in the liquid nitrogen container and the thermostat heat transfer coil 22. The control contacts 37 of electric control system E are short circuited, the tube grid deenergized and current flows in the vacuum tube plate circuit, energizing the relay 45 and current flows through wire 50, armature 45ᵇ, contact 45ᶜ, wire 52, and solenoid 43. Valve 42 is lifted from port 41 and the evaporated nitrogen passes to the atmosphere. The back pressure of nitrogen gas in the thermostat being released through the air valve, causes more liquid nitrogen to be forced into the coils 22 where it evaporates and produces cooling. As the thermostat cools, the volume of toluene control fluid in chamber 27 contracts and the deficiency is replaced by toluene from the reservoir 30. When the thermostat has been cooled to the desired predetermined temperature, which may be determined by means of thermocouples or otherwise, the external short circuit is removed from the contacts 37 causing the vacuum tube relay to become inoperative and resulting in the closing of port 41 of the fluid valve V. Once again, back pressure is built up in the thermostat and any remaining liquid nitrogen is forced back into the container C. (The excess pressure necessary for this is produced by the rapid evaporation in a relatively warm confined space of part of the remaining liquid nitrogen.) The port 32 is then closed by needle valve 33, thus hydraulically connecting the manometer to chamber 27 and isolating the reservoir 30 from the system. Contact 36 is adjusted with reference to the mercury column 34, so that the contact therebetween is just broken. As soon as the thermostat warms slightly (due to heat transfer by conduction along the gradient tube, convection at the thermostat ends, and radiation all over), the toluene control liquid expands and forces the mercury column 34 upwardly and makes contact with contact 35, thus closing the manometer relay control circuit contacts 37. When the thermostat again cools to the previously set controlling temperature, the control liquid contracts in volume and the manometer contacts 35 and 36 are open-circuited and the cooling-stoppage process is repeated. The thermostat temperature is thenceforth automatically maintained to within very close limits until it is desired to stop it. To do this, the needle valve 1 is unscrewed again connecting the reservoir 30 to the manometer system and control chamber 6 27; the air pressure through pipe 40 is shut off from the surface of the liquid nitrogen in the container 38 and the fluid valve V and vacuum tube relays are disconnected from their respective power supplies. This cooling system results in trouble-free automatic temperature control of the thermostats to at least within plus or minus 0.03° C. at temperatures almost to the freezing point (approximately −110° C.) of the toluene temperature control fluid. Control at temperatures lower than this can readily be obtained by the use of a control fluid having a lower freezing point than toluene.

If it is desired to operate the thermostat above room temperatures, the wires 25 of electric heater 23 are connected in place of the fluid valve V, and the container C is disconnected from the system. Power flows through contact 45ᵈ to the heater wires 25 when the connectors 35, 36 of the manometer is broken, which occurs when the temperature of the thermostat falls. Otherwise, the operation of the temperature control system is the same as for cooling. If desired, temperatures above room temperatures may be maintained by substituting for the liquid nitrogen in flask 38, a heating medium such as hot oil or gases, in which case the current to operate the fluid valve V will be supplied through contact 45ᵈ.

The material to be fractionated which may be as small as 0.001 g. is placed in a thin walled glass sampling tube, all air is removed therefrom, and the tube sealed off. Free space in the sampling tube is kept at a minimum, so that it may be broken by the expansion of the material upon being gently heated. This tube and sample is placed in and adjacent to one end of the distilling tube 15, which is then pumped out to a pressure of the order of $2 \times 10^{-7}$ mm. of mercury and the tube sealed off. The temperatures of the cooler 10 and heater 11 are adjusted to experimentally determined values. Because of the difference in temperature between the cooler 10 and heater 11, a temperature gradient G (see Figure 3) is present in the cooler-to-heater gradient tube 12, which in a short time assumes a steady condition. The distilling tube 15 is placed in the bore 16 of the apparatus and attached to a device (not illustrated) beyond the electric heater 17 for pulling the distilling tube through the bore 16 from the cooler toward the heater, which device also keeps slowly turning the tube 15. After the distilling tube has come to a temperature equilibrium with the thermostats 10 and 11 and connecting gradient tube 12, the portion of tube 15 surrounding the material-filled sample tube is gently heated until the sample tube is broken by the expanding liquid. Sufficient time is allowed for all the material undergoing fractionation to distill into the gradient, before the pulling and turning of distilling tube 15 is begun. It will be observed that the pressure in tube 15, if the tube were allowed to stand for an indefinite period, would be equal to the sum of the partial pressures of the substances comprising the mixture at the temperature corresponding to the temperature of the coldest part of the tube, and there would be a migration of the molecules toward the coldest part of the tube, so that in time the material would collect there. However, moving the tube at the proper speed through the gradient causes a pressure gradient inside the tube between the heater and cooler. A proper selection of the pulling speed of the tube will cause the components to distill and separate and the components will collect in separate bands. The appearance of the material at the start of a run is shown by 15ª of Figure 4, which shows the mixture which has distilled from the warm toward the cold end of tube 15 and adhering thereto in a thin crystal and/or liquid layer (when para and meta xylene are being fractionated).

The tube is then turned and pulled at a speed so that the most volatile component will stay in the gradient near the cold end but the less volatile components will not have time to migrate to the cold end. The forward movement of the tube from the cooler toward the heater will cause the material to be repeatedly distilled, condensed, and separated into its components, each of which will form a separate band along the distilling tube. When the band of the least volatile component is moved into the even temperature zone of the heater end of the gradient, as observed through the slot 14, the pulling speed of tube 15 is increased. When the least volatile component band has nearly reached the outside end of the heater, it is of a high degree of purity, and it is time to remove it. The enlarged drawing of the distilling tube 15, of Figure 5, shows at 15ᵇ and 15ᶜ the appearance of the mixture components at the end of a fractionation, when the volatile mixture is composed of but two substances, e. g. meta and para xylene.

Either of two methods may be used to remove the fractions as they are separated.

In the first method, the temperature of the heater 11 is lowered to that of the cooler 10. Since there is no longer a temperature gradient existing between the heater 11 and cooler 10, distillation stops, and the mixture components remain in a fixed position in the distilling tube 15, the distilling tube is quickly pulled out of the apparatus until the section containing the first fractionation is beyond the outside end of heater 11. The distilling tube 15 is then heated with a hot flame at a point between the first fraction and the remainder of the material undergoing fractionation until the tube wall collapses, thereby isolating the first fraction. The distilling tube is then pushed back into its former position in the apparatus, and the temperature gradient is re-established and the process is resumed. If all of the least volatile components has not been removed, the distillation process is repeated until all of the least volatile component has been removed. It is easy to determine whether or not all of the least volatile component has been removed, because with the proper adjustment of heater and cooler temperatures and pulling speed, each component forms a separate, distinct band in the section of the distilling tube in the gradient, which may be observed through slot 14.

In certain cases of extremely volatile substances where sufficiently low temperatures cannot be conveniently obtained in the cooler 10, we have found that it is advantageous to pack the distilling tube 15 with glass beads, since thereby a greater surface is offered for the condensation of the material and its progress to the coldest portion of the distilling tube is greatly retarded.

The second method of removing the separated products consists in lowering the temperatures of the heater and of the cooler until there is substantially no vapor pressure. A liquid air trap and a pump (not shown) are connected to the heater end of the distilling tube 15, and a small leak is connected to the cooler end of the distilling tube through which dry air may be passed. The heater 17 is connected to a power supply and brought to a temperature suitable for vaporizing the least volatile fractionation. Pumping is begun and the first fractionation of material is slowly brought into the zone of the electric heater 17. As the substance is vaporized, it is swept out of the distilling tube 15 by the air and is collected in a suitable trap. After the first fraction has been taken out, the leak is removed, the tube is again sealed, the distilling tube is re-evacuated, and the process is repeated.

In the case of a binary mixture, the least volatile substance is first removed as described. The material is again distilled, and, if all of the least volatile component has not been removed, it may be necessary to continue the process even further, but it is to be noted that the least volatile substance obtained is of an extremely high degree of purity. Our invention, of course, is not limited to binary mixtures but mixtures having more than two substances may likewise be fractionated, each of the volatile substances remaining in the mixture being taken off in succession in inverse ratio to their volatilities.

The following is a non-limiting example of a typical application of our invention. In this case para and meta xylenes were fractioned. These two substances are extremely difficult to separate by hitherto known methods, due to their closely similar physical characteristics. Their boiling points at atmospheric pressures are almost identical, 139° C. and 138° C., respectively. Visual observation of the separation process was facilitated by the fact that p-xylene, which has a melting point of 13.2° C., is crystalline, and m-xylene, having a melting point of −51° C. remains liquid under the proper conditions of gradient and pulling speed for producing fractionation. The p-xylene, being the least volatile, is removed first from the distilling tube at the completion of the process. The following temperatures and pulling speeds were found to be effective in the separation of these xylenes.

Cooler temperature _____ −70° C.
Heater temperature _____ −15° C.
Pulling speed _____ 1 cm. per minute Ortho-nitro toluene and para-nitro toluene were fractionated successfully. The boiling point of the first is 220° C. and the boiling point of the second is 237° C. The melting point of ortho is −10.5° C., and the melting point of para is 51° C. At the beginning of the run, the cooler temperature was −20° C. and the heater temperature was 25° C. A suitable pulling speed was 1 cm. per minute.

By our invention, it is possible to control the temperatures of the heater and cooler and, consequently, the slope of the gradient within extremely close limits. It is possible to control the temperature of the heater and the cooler within 0.03° C., and the materials separated are of a purity which so far as known tests are concerned is absolute.

While we have illustrated and described a preferred embodiment of our invention, it will be understood that the invention is not limited thereto, but may be otherwise embodied and practiced with in the scope of the following claims.

We claim:

1. The method of fractional distillation of a mixture the components of which have different vapor pressures, which consists of introducing the mixture into an elongated sealed container and passing the container longitudinally through a controlled temperature gradient from the cold zone toward the hot zone, at such a speed that the components of the mixture will repeatedly distill and separate into bands in the container along the gradient.

2. The method of fractional distillation of a mixture the components of which have different vapor pressures under the conditions of operation which consists of introducing the mixture into an evacuated elongated sealed container and passing the container substantially longitudinally through a controlled temperature gradient from the cold zone toward the hot zone, at such a speed that the components of the mixture will repeatedly distill and separate into bands in the container along the gradient, the band of the least volatile component being nearest the higher temperature end of the gradient.

3. The method of fractional distillation of a mixture, the components of which have different vapor pressures under the conditions of operation which consists in introducing the mixture into a sealed elongated distilling tube having a high degree of vacuum, introducing said distilling tube into a space connecting a cold zone and a hot zone, and causing relative longitudinal movement between the tube and the space at such a speed that the components of the mixture will repeatedly distil and condense and while in the vapor phase will move from the hot zone toward the cold zone until the components are physically separated into sections along the container, removing the container from the gradient and separating the sections.

4. In the method of fractional distillation of a mixture the components of which have different vapor pressures, the steps comprising partly filling an elongated container with the mixture, sealing the container and passing the container longitudinally through an elongated passage provided with heated and cooled zones between which a temperature gradient is established, the temperature in the gradient being such that the difference of the vapor pressure of the components is sufficient to cause fractionation by repeated evaporation and condensation of the particles along the container until the components are physically separated into sections along the container, removing the container from the apparatus and separating the sections.

5. The method of fractional distillation of a mixture of solids or liquids which have different vapor pressures under the conditions of operation, which consists of moving an elongated sealed highly vacuumized container, having therein the mixture, longitudinally through an increasing temperature gradient from the cold end to the hot end until the components of the mixture are physically separated into fractions along the container and removing the fractions.

6. The method of fractional distillation of a mixture of solids or liquids which have different vapor pressures under the conditions of operation, which consists of moving an elongated sealed highly vacuumized container, having therein the mixture, longitudinally through an increasing temperature gradient from the cold end to the hot end, the upper limit of the gradient and speed of passage of the container therealong being such that only the least volatile component can remain unvaporized therein, until at least one of the components of the mixture is separated from the mixture and removing the separated component from the container.

7. In the method of fractional distillation of a mixture having at least two components of different vapor pressures under the conditions of operation, the steps of introducing the mixture into a highly evacuated elongated sealed container, placing the sealed vacuumized container containing said mixture in a rising temperature gradient, the temperatures in the gradient being such that the difference of the vapor pressures of the components is sufficient to permit fractionation, moving the container from the cold zone to the hot zone until at least one of the components is separated from the mixture, and removing the separated component from the container.

GUENTHER J. K. von ELBE.
BENJAMIN B. SCOTT, Jr.